219-121
9/28/82 OR 4,352,005

United States Patent [19]

Evans et al.

[11] 4,352,005

[45] Sep. 28, 1982

[54] TRIMMING A CIRCUIT ELEMENT LAYER OF AN ELECTRICAL CIRCUIT ASSEMBLY

[75] Inventors: Jonathan L. Evans; William H. Learmonth, both of Edinburgh, Scotland

[73] Assignee: Ferranti Limited, Cheadle, England

[21] Appl. No.: 207,890

[22] Filed: Nov. 18, 1980

[30] Foreign Application Priority Data

Nov. 23, 1979 [GB] United Kingdom ................. 7940615

[51] Int. Cl.[3] ........................... B23K 9/00; B26D 3/00

[52] U.S. Cl. ........................... 219/121 LJ; 29/610 R; 83/39; 219/121 LH; 338/195; 427/53.1

[58] Field of Search .................... 29/847, 426.1, 428.4, 29/825, 610 R; 427/53.1, 96; 338/195; 83/39; 219/121 LH, 121 LJ

[56] References Cited

U.S. PATENT DOCUMENTS 4,081,653 3/1978 Koo et al. .................... 219/121 LH
4,146,673 3/1979 Headley ......................... 219/121 X
4,172,741 10/1979 Johnson ......................... 219/121 X
4,190,854 2/1980 Redfern ......................... 219/121 X

FOREIGN PATENT DOCUMENTS 55-44745 3/1980 Japan .......................... 219/121 LH

OTHER PUBLICATIONS

*Laser Trimming of Silicon-Chromium Thin-Film Resistors,* Fehlhaber; Peter, pp. 33-36, Jul. 1971.

*Primary Examiner*—Michael R. Lusignan
*Attorney, Agent, or Firm*—Kerkam, Stowell, Kondracki & Clarke

[57] ABSTRACT

In trimming a constituent layer (10) of a circuit element, through which layer current is to flow along an axis (14), a first channel (16), extending through the layer from one layer edge, (17), partially across the width of the layer, transversely to the axis, is provided in a first, coarsest trimming action, a second channel (18), extending through the layer, from the extremity of the first channel remote from the layer edge, parallel to the axis, is provided in a second finer, trimming action, and in each of at least one further trimming action a further channel (20) is provided, each further channel extending through the layer parallel to the axis, the further channels being successively between the immediately previously provided channel and the layer edge, there being successively greater accuracies associated with the constituent trimming actions, each further channel possibly extending further from the first channel than the immediately previously provided channel.

1 Claim, 4 Drawing Figures

TRIMMING A CIRCUIT ELEMENT LAYER OF AN ELECTRICAL CIRCUIT ASSEMBLY

This invention relates to the trimming of layers of materials in electrical circuit assemblies, each such layer to comprise at least part of a constituent circuit element of an assembly, and the layer being deposited on a substrate.

Such a layer may be deposited directly onto a substrate, or onto another layer previously deposited onto a substrate.

In particular, the present invention relates to deposited layers, through each of which layers, and under normally expected operating conditions of the circuit assembly including the layer, a current flows between at least one pair of spaced terminals associated with the layer, or between points of the layer which can be considered to be at least one pair of spaced terminals. Between the pair of terminals there can be considered to be an axis of the layer, along which axis it is convenient to consider that the current flows. It is not required that such an axis is a straight line, nor that it is at least substantially coincident with the axis of symmetry of the layer, but usually it is either smoothly curved, or is a straight line.

For convenience in this specification and the accompanying claims only the trimming of resistive layers, to provide required resistors, will be considered. However, it will be understood that the present invention is also applicable to the trimming of other types of layers, through each of which layers a current is to flow along an axis between a pair of spaced terminals associated with the layer.

The layer may be photolithographically etched after it has been deposited. Whether it is photolithographically etched or not, the layer has a resistance provided with a predetermined accuracy. The resistance of such a layer is proportional to its length, and inversely proportional to its breadth. Even if a photolithographic etching step is to be performed, there are many applications in relation to which the required resistance cannot be provided sufficiently accurately by a photolithographic etching step alone. The present invention relates to the trimming of the layer in order to provide the required resistance more accurately subsequent to a photolithographic etching step, if performed, and/or more accurately than when the layer has been deposited. In consequence, it is required to ensure that the resistance of the layer after the photolithographic etching step, if performed, and/or after the layer has been deposited, is less than the required resistance of the layer.

Figure 1:
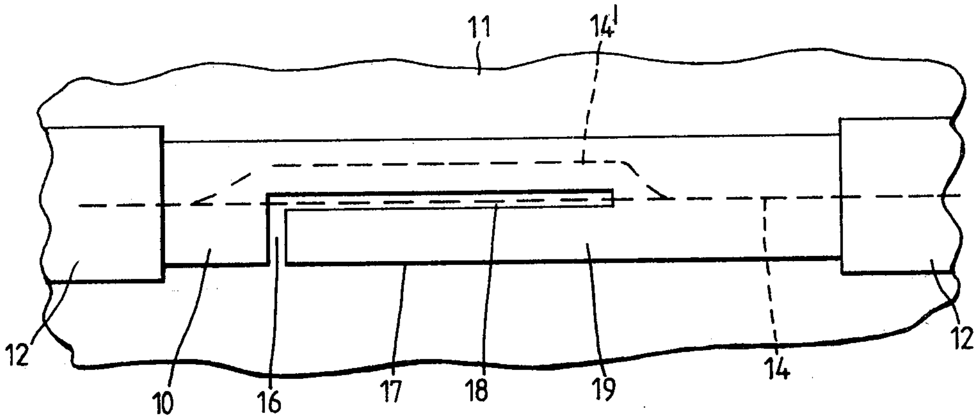
Fig. 1 (PRIOR ART)

In the accompanying FIG. 1 an elongated, linearly extending, resistive layer is shown extending between a pair of spaced terminals, each terminal extending wholly across the breadth of the layer. The axis of the layer along which current can be considered to flow comprises the longitudinal axis of symmetry of the layer.

It is known to trim such a layer by removing portions of the resistive material to form channels through the layer, in a first, coarser, trimming action there being provided a first channel extending, from an edge of the layer, partially across the width of the layer, at least substantially transversely to the axis between the pair of terminals; and in a second, finer, trimming action there being provided a second channel extending from the extremity of the first channel remote from the edge of the layer, and at least substantially parallel to the axis between the pair of terminals. If the first and second channels are considered as a single channel, and the length L of the channel as it is being cut is plotted against the ratio of the corresponding instantaneous change $\Delta R$ in the resistance of the layer, over the desired resistance R, as shown in the accompanying FIG. 2, the graph obtained comprises a first, larger-slope, straight line portion through the origin of the graph, and corresponding to the first, coarser, trimming action, and a second, lesser-slope, straight line portion, extending from the extremity of the first line portion remote from the origin, the second line portion corresponding to the second, finer, trimming action.

The provision of the first and second channels causes the direction of current flow within the layer to be changed at the part of the layer with the channels, but it is still possible for this current to be considered to be flowing along an axis of the layer. Further, as any portion of the new axis is at least substantially parallel to the original axis, the displaced portions of the new axis being at least substantially parallel to the second channel, it is convenient to refer to only one axis of the layer, irrespective of whether the channels have been provided in the layer, or not.

It can be considered that the provision of the channels increases the aspect ratio in relation to the current flow through the layer, and at the part of the layer in which the channels are provided, the aspect ratio at any constituent part of the layer comprising the length of the current path divided by its width. In addition, the first and second channels partially enclose a region of the layer through which current does not flow.

It is required that there are predetermined, and successively greater, accuracies associated with each such trimming action, and the preceding photolithographic etching step, and the layer deposition step.

The trimming of the layer may be controlled automatically, for example, either at least the second trimming action is terminated automatically under the control of monitoring means; or the trimming of the layer may be under the control of a computer, employing adaptive techniques.

Figure 2:
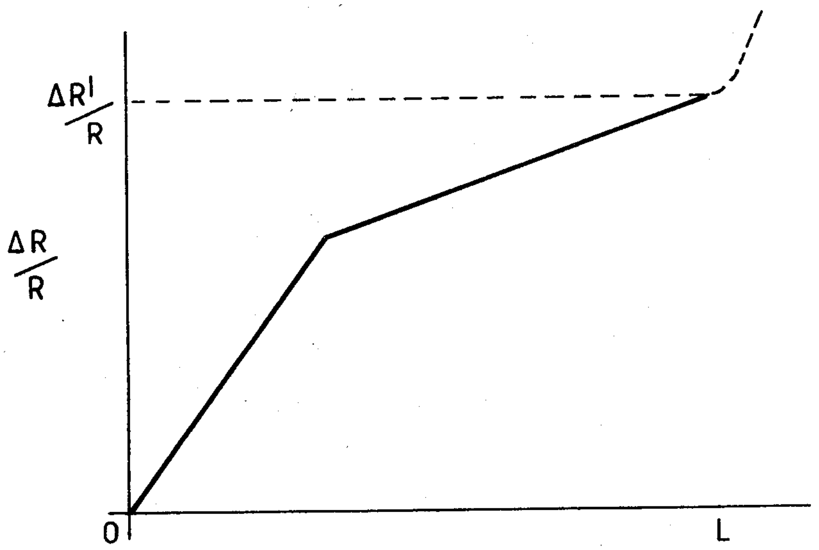
Fig. 2 (PRIOR ART)

For a batch of substantially identical layers required to have the same resistance, the expected average, required, accumulated change $\Delta R'$ in the resistance R of each layer in both trimming actions, because of the predetermined accuracy with which the layers are provided before they are trimmed, is indicated by a dotted line in the graph of FIG. 2, with the required constant value for the ratio $\Delta R'/R$. Thus for an average layer, the second line portion of the graph is required to terminate at its intersection with this dotted line.

It is immaterial whether or not the actual, required, accumulated change in the resistance for a deposited layer to be trimmed differs from the expected average value $\Delta R'$, if the trimming is automatically controlled, for example, by monitoring means, or the trimming is adaptively controlled by a computer. Thus, the actual, required accumulated change in the resistance of the layer is capable of being represented in the graph by the expected average value $\Delta R'$, without inconvenience, the scale factors associated with the abscissa and ordinate axes of the graph automatically being varied accordingly for other than average layers.

When trimming a particular layer, the longer the first channel the greater the slope of the second line portion of the graph, whereas the less the slope of the second line portion the more accurately can the required resistance R of the layer be obtained.

It is desirable that the combined length of the first and second channels, required to be cut, is not so great that an undesirably long trimming time is required, but usually this is of less importance than obtaining the required resistance R with sufficient accuracy.

It is essential that the lengths of the first and second channels, individually, conveniently can be provided within the layer as deposited. Further, in this respect, it is required that neither the first channel, nor, in particular, the second channel, approaches too near to a terminal of the layer, because this causes the slope of the corresponding second line portion of the graph to increase, at its extremity remote from the first line portion, from its constant value, making it more difficult to obtain the required resistance of the layer, than otherwise would be the case. For example, when the second channel approaches too near to a terminal of the layer, which can occur if a large change $\Delta R$ in the resistance is required, there is an increased possibility that the second channel is made too long, as indicated by the dotted extremity of the second line portion of the graph of FIG. 2.

Thus, the first channel is required not to be too small in length, with the consequent possibility that the accuracy with which the required resistance R for the layer is obtained is smaller than otherwise would be the case.

When trimming a batch of layers at least substantially identical with each other, and required to have the same resistance, an optimum length may be chosen for the first channel, taking into account the expected average accuracy with which the layers are provided, and the desired expected average accuracy with which the resistance of each trimmed layer is required to be provided, instead of automatically controlling the first, coarser, trimming action, for example, either by monitoring means or a computer.

It is an object of the present invention to provide a novel method of trimming a deposited layer, through which layer current is to flow along an axis between a pair of spaced terminals, the method comprising a modification of the known method of trimming such a deposited layer, and referred to above, for a batch of layers at least substantially identical with each other, and required to have the same resistance, the modified method enabling each layer to be trimmed to the desired expected average accuracy more conveniently than the known method, and with the possibility that the required resistance of each layer is obtained more accurately than when the unmodified method is employed.

According to the present invention a method of trimming a layer of material deposited on a substrate, the layer to comprise at least part of a constituent circuit element of an electrical circuit assembly, at least one pair of spaced terminals being provided for the layer, and under normally encountered operating conditions for the circuit assembly current flows between the pair of terminals along an axis of the layer, the method comprising providing a first channel through the layer and extending, from one edge of the layer, partially across the width of the layer, at least substantially transversely to the axis, in a first, coarsest, trimming action, providing through the layer a second channel extending from the extremity of the first channel remote from the edge of the layer, and at least substantially parallel to the axis of the layer, in a second, finer, trimming action, all in a known manner, and there is at least one further trimming action, each such further trimming action comprising providing a further channel through the layer extending at least substantially parallel to the axis of the layer, each further channel being provided successively between the immediately previously provided channel and the edge of the layer, there being a plurality of regions of the layer, each region being partially enclosed by the first channel, and either the second channel or a further channel, the regions being of successively smaller breadths between the edge of the layer and the immediately previously provided channel, through each of which regions a current does not flow, each succeeding further channel extending at least within the region partially enclosed by the first channel and the immediately previously provided channel, and each further channel possibly extending further from the first channel than the immediately previously provided channel, and in the method there are predetermined and successively greater accuracies associated with the constituent trimming actions.

It is required to ensure that the resistance of the layer after the photolithographic etching step, if performed, and/or after the layer has been deposited, and after each constituent trimming action except the last, is less than the required resistance of the layer.

Usually the resistance of the layer is increased in each constituent trimming action.

Usually, the initial part of each further channel does not reduce the resistance of the layer, so that the cutting tool does not have to be initially precisely located, especially if it is initially located adjacent to the first channel. The resistance of the layer only begins to change when the further channel is adjacent to the extremity of the immediately previously provided channel remote from the first channel. It may be that the resistance of the layer begins to change before the further channel extends beyond the extremity of the immediately previously provided channel. Hence, the associated region partially enclosed by the first channel and the immediately previously provided channel, and through which region current does not flow, may have a boundary, between the extremity of the immediately previously provided channel remote from the first channel, and the edge of the layer, extending inwardly towards the first channel, at least from the extremity of the immediately previously provided channel remote from the first channel. It is convenient to consider only the length of each further channel from where, in the trimming method, the resistance of the layer begins to change, by the provision of the further channel, as being the effective length of the further channel.

Figure 3:
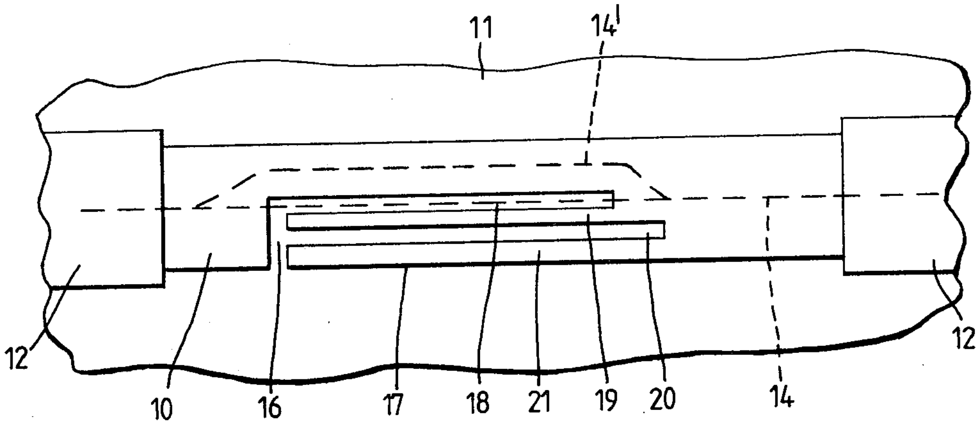

A resistive layer trimmed by a method in accordance with the present invention, having three constituent trimming actions, and the layer comprising a modified form of the layer shown in FIG. 1, is shown in the accompanying FIG. 3.

Figure 4:
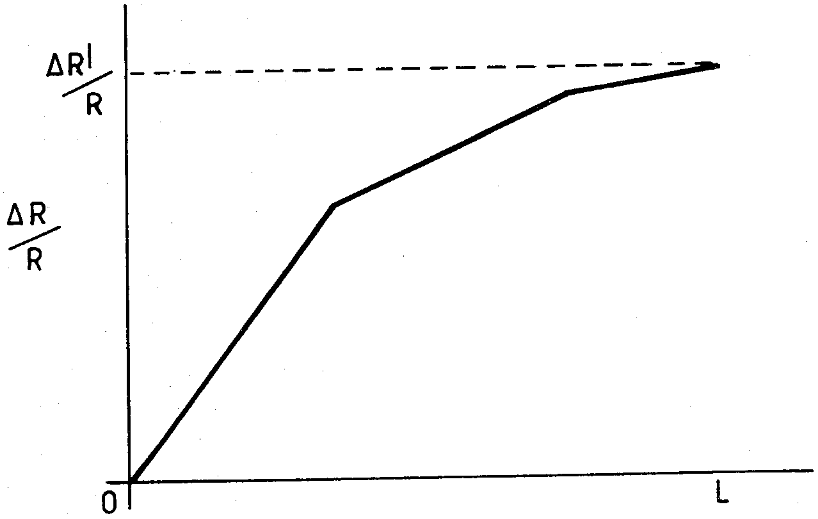

The graph obtained by employing a method in accordance with the present invention having three constituent trimming actions, and corresponding to the graph of FIG. 2, is shown in accompanying FIG. 4. Only the effective length of each further channel, as referred to above, is considered as contributing to the total length L of the channels as they are being cut. A third, least-slope, straight line portion extends from the extremity of the second line portion remote from the origin, the third line portion corresponding to the third, finest, trimming action, and the third line portion is required to terminate at its intersection, with the dotted line representing the required constant value for the ratio $\Delta R'/R$, comprising the required, accumulated change $\Delta R'$ in the resistance in all the trimming actions for the layer, over the desired resistance R for the layer.

The effective aspect ratio in relation to the current flow through the layer, and in relation to each further channel, is less than the aspect ratio in relation to the first and second channels considered alone. In addition, because the effective aspect ratio values successively decrease, the greater the number of further channels the more smoothly does this decrease occur. Thus, the obtaining of constituent trimming actions having associated therewith predetermined and successively greater accuracies is facilitated, and the more conveniently can the layer be trimmed to the desired accuracy, the greater the number of further channels provided.

There is also the possibility that the required resistance of the layer is obtained more accurately the greater the number of further channels provided, and compared with when only the first and second channels are provided.

Usually, at least the final trimming action is automatically controlled, for example, either by monitoring means or a computer.

According to another aspect the present invention comprises an electrical circuit assembly having a constituent circuit element with a layer of deposited material trimmed by a method referred to above.

The present invention will now be described by way of example with reference to the accompanying drawings, in which FIG. 1 is a plan view of part of an electrical circuit assembly, showing a constituent circuit element with a layer of deposited resistive material, the layer being trimmed in a known manner by providing first and second channels through the layer, FIG. 2 is of a graph of the total length L of the channels as they are being cut, against the ratio of the corresponding instantaneous change $\Delta R$ in the resistance of the layer, over the desired resistance R, FIG. 3 corresponds to FIG. 1 but is of a resistive layer trimmed by a method in accordance with the present invention, there being a further, third, channel provided through the layer, and, FIG. 4 is of a graph corresponding to the graph of FIG. 2, but is in relation to the trimming of the layer of FIG. 3.

The illustrated part of an electrical circuit assembly shown in FIG. 1 comprises a deposited elongated layer 10 of resistive material, comprising a constituent resistor circuit element of the electrical circuit assembly. The layer 10 is of an alloy of nickel and chromium, and is deposited upon the substrate 11 of electrical insulation material. A pair of spaced terminals 12, of gold, are provided one at either end of the elongated layer 10. The layer is rectangular shaped in plan, and the terminals 12 extend across the whole of the width of the layer, the layer extending linearly between the terminals. Under normally expected operating conditions of the electrical circuit assembly a current flows between the terminals, and it can be considered that the current flows along the longitudinal symmetrical axis of the layer, indicated by the dotted line 14.

The resistance R of the layer is proportional to its length, and inversely proportional to its breadth, for example, the sheet resistivity of the layer being 300 ohms per square. The accuracy with which the layer is deposited can be predetermined as, say, 10%. The layer is photolithographically etched after it has been deposited so that the required resistance R is obtained more accurately, there being a predetermined accuracy of, say, 2% associated with the photolithographic etching step. However, this is insufficiently accurate for many applications, so that the layer is required subsequently to be trimmed to the required resistance R.

Because the layer subsequently is to be trimmed, it is required that the resistance of the layer after the photolithographic etching step is less than the required resistance of the layer.

As shown in FIG. 1, it is known to trim such a layer to an accuracy of, for example, 0.1%, by removing portions of the resistive material, by a laser cutting tool, to form channels through the layer. In a first, coarser, trimming action there is provided a first channel 16, extending from an edge 17 of the layer, partially across the width of the layer, transversely to the axis 14. In a second, finer, trimming action there is provided a second channel 18 extending from the extremity of the first channel 16 remote from the layer edge 17, parallel to the axis 14.

The total length L of the channels as they are being cut, against the ratio of the corresponding instantaneous change $\Delta R$ in the resistance of the layer, over the desired resistance R, is shown in the graph of FIG. 2. The graph comprises a first, larger-slope, straight line portion through the origin O of the graph, and corresponding to the first, coarser, trimming action, and a second, lesser-slope, straight line portion, extending from the extremity of the first line portion remote from the origin O, the second line portion corresponding to the second, finer trimming action.

The provision of the first channel 16 and the second channel 18 causes the direction of current flow within the layer to be changed at the part of the layer with the channels. The new axis associated with the layer is at least substantially parallel to the original axis, the displaced portions 14' of the new axis being at least substantially parallel to the second channel 18.

The provision of the channels 16 and 18 increases the aspect ratio in relation to the current flow through the layer, and at the part of the layer in which the channels are provided, the aspect ratio at any constituent part of the layer comprising the length of the current path divided by its width. In addition, the first and second channels partially enclose a region 19 of the layer through which current does not flow.

It is required that there are predetermined, and successively greater, accuracies associated with each such trimming action, and the preceding photolithographic etching step, and the layer deposition step.

The trimming of the layer may be controlled automatically, for example, either at least the second trimming action is terminated automatically under the control of monitoring means; or the trimming of the layer may be under the control of a computer, employing adaptive techniques.

For a batch of substantially identical layers required to have the same resistance, the expected average, required, accumulated change in the resistance R of each layer in both trimming actions is $\Delta R'$, because of the predetermined accuracy with which the layers are etched photolithographically. In the graph of FIG. 2 the change $\Delta R'$ in resistance is indicated by a dotted line with the required constant value for the ratio $\Delta R'/R$. Thus, for an average layer, the second line portion of the graph is required to terminate at its intersection with this dotted line.

For any layer the trimming of which is to be controlled automatically, for example, by monitoring means, or the trimming is adaptively controlled by a computer, the actual, required accumulated change in the resistance of the layer is capable of being represented in the graph of FIG. 2 by the expected average value $\Delta R'$, the scale factors associated with the abscissa and ordinate axes of the graph automatically being varied accordingly for other than average layers.

When trimming the layer, the longer the first channel 16 the greater the slope of the second line portion of the graph, whereas the less the slope of the second line portion the more accurately can the required resistance R of the layer be obtained.

It is essential that the lengths of the first channel 16, and the second channel 18, individually, conveniently can be provided within the layer. Further, in this respect, it is required that neither the first channel, nor, in particular, the second channel, approaches too near to a terminal 12, because this causes the slope of the corresponding second line portion of the graph to increase, at its extremity remote from the first line portion, from its constant value, making it more difficult to obtain the required resistance of the layer, than otherwise would be the case. For example, when the second channel 18 approaches too near to a terminal 12 of the layer, which can occur if a large change $\Delta R$ in the resistance is required, there is an increased possibility that the second channel is made too long, as indicated by the dotted extremity of the second line portion of the graph of FIG. 2.

Thus, the first channel 16 is required not to be too small in length, with the consequent possibility that the accuracy with which the required resistance R for the layer is obtained is smaller than otherwise would be the case.

In accordance with the present invention, the known method of trimming the resistive layer 10 is modified by having a further, third trimming action, in which a third channel 20 is provided through the layer. The third channel 20 extends parallel to the axis 14 between the second channel 18 and the layer edge 17. There is a region 21 of the layer partially enclosed by the first channel 16 and the third channel 20 through which current does not flow, the region 21 being of smaller breadth, than the corresponding region 19 partially enclosed by the first and second channels 16 and 18, between the layer edge 17 and the channels 20 and 18, respectively. The third channel 20 extends from the first channel 16 within the region 21, and so that usually, as shown, the third channel extends further from the first channel than the second channel. It is essential that there are predetermined and successively greater accuracies associated with each constituent trimming action. It is convenient to consider only the length of the third channel from where, in the trimming method, the resistance of the layer begins to change, by the provision of the further channel, as being the effective length of the third channel.

There is shown in FIG. 4 the graph corresponding to the graph of FIG. 2, and obtained by employing the modified method in accordance with the present invention having three constituent trimming actions. Only the effective length of the third channel, as referred to above, is considered as contributing to the total length L of the channels as they are being cut. The graph has a third, least-slope, straight line portion extending from the extremity of the second line portion remote from the origin O, the third line portion corresponding to the third, finest, trimming action. The third line portion is required to terminate at its intersection with the dotted line representing the required constant value for the ratio $\Delta R'/R$, comprising the required, accumulated change $\Delta R'$ in the resistance in all the trimming actions for the layer, over the desired resistance R for the layer.

Usually, the initial part of the third channel does not reduce the resistance of the layer, so that the cutting tool does not have to be initially precisely located, especially if it is initially located adjacent to the first channel. The resistance of the layer only begins to change when the third channel is adjacent to the extremity of the second channel remote from the first channel. It may be that the resistance of the layer begins to change before the third channel extends beyond the extremity of the second channel. Hence, the associated region partially enclosed by the first and second channels, and through which region current does not flow, may have a boundary, between the extremity of the second channel remote from the first channel, and the edge of the layer, extending inwardly towards the first channel, at least from the extremity of the second channel remote from the first channel.

The effective aspect ratio in relation to the current flow through the layer, and in relation to the third channel, is less than the aspect ratio in relation to the first and second channels considered alone. Thus, the obtaining of second and third trimming actions having associated therewith predetermined and successively greater accuracies is facilitated. There is also the possibility that the required resistance of the layer is obtained more accurately compared with when only the first and second channels are provided, for example, an accuracy greater than 0.1% being obtained.

Usually, at least the third trimming action is automatically controlled, for example, either by monitoring means or a computer.

In a method in accordance with the present invention there may be a plurality of further trimming actions, after the second trimming action, each such further trimming action comprising providing a further channel through the layer extending at least substantially parallel to the axis of the layer. Each further channel is provided successively between the immediately previously provided channel and the edge 17 of the layer. There are a plurality of regions in the layer, each region being partially enclosed by the first channel, and either the second channel or a further channel, the regions being of successively smaller breadths between the layer edge 17 and the immediately previously provided channel, and through each of which regions a current does not flow. Each succeeding further channel extends at least within the region partially enclosed by the first channel and the immediately previously provided channel, and each further channel possibly extends further from the first channel than the immediately previously provided channel. In any method in accordance with the present invention it is required that there are predetermined and successively greater accuracies associated with the constituent trimming actions.

The resistance of the layer begins to change when each further channel is adjacent to the extremity of the immediately previously provided channel remote from the first channel.

The effective aspect ratio in relation to the current flow through the layer, and in relation to each further channel, is less than the aspect ratio in relation to the first and second channels considered alone. In addition, because the effective aspect ratio values successively decrease, the greater the number of further channels the more smoothly does this decrease occur. Thus, the obtaining of constituent trimming actions having associated therewith predetermined and successively greater accuracies is facilitated, and the more conveniently can the layer be trimmed to the desired accuracy , the greater the number of further channels provided. There is also the possibility that the required resistance of the layer is obtained more accurately the greater the number of further channels provided, and compared with when only the first and second channels are provided.

Usually, at least the final trimming action is automatically controlled, for example, either by monitoring means or a computer.

It is required to ensure that the resistance of the layer after the photolithographic etching step, and after each constituent trimming action, except the last, is less than the required resistance of the layer.

Usually the resistance of the layer is increased in each constituent trimming action.

When trimming a batch of layers at least substantially identical with each other, and required to have the same resistance, an optimum length or lengths may be chosen for the first channel, and for any subsequent channel, except the final, further, channel, taking into account the expected average accuracy with which the layers, and the channels are provided, and also taking into account the desired expected average accuracy with which the resistance of each trimmed layer is required to be provided, instead of automatically controlling, for example, either by monitoring means, or a computer, the constituent trimming actions, except the final, further, trimming action.

The layer may have any convenient shape in plan.

The material of the deposited layer may not be resistive.

The deposited layer may comprise only part of a circuit element of the electrical circuit assembly.

The layer may be deposited onto another layer previously deposited onto the substrate.

The substrate may be of any convenient material.

Instead of terminals being provided for the layer, the layer may extend between spaced points which can be considered to be a pair of terminals.

There may be more than one spaced pair of terminals, or such points, associated with the layer.

The axis of the layer, along which axis it is convenient to consider that current flows, may not be at least substantially coincident with the axis of symmetry of the layer.

Whilst the axis may not be a straight line, it is usually smoothly curved.

The first channel may extend only substantially traversely to the axis, and the second channel, and each further channel, may extend only substantially parallel to the axis.

The layer may not be photolithographically etched after it has been deposited.

The further channels may not be contiguous with the first channel, and/or the second channel, and/or with each other.

Any convenient cutting tool may be employed to trim the layer, for example, a laser.

What we claim is:

1. A method of trimming a layer of material deposited on a substrate, the layer to comprise at least part of a constituent circuit element of an electrical circuit assembly, at least one pair of spaced terminals being provided for the layer, and under normally encountered operating conditions for the circuit assembly current flows between the pair of terminals along an axis of the layer, the method comprising providing, in a first, coarsest, trimming action, a first channel through the layer and extending, from one edge of the layer partially across the width of the layer, at least substantially transversely to the axis, providing through the layer, in a second, finer, trimming action, a second channel extending from the extremity of the first channel remote from the edge of the layer, and at least substantially parallel to the axis of the layer, and providing at least one further trimming action, each such further trimming action comprising providing a further channel through the layer extending at least substantially parallel to the axis of the layer, each said further channel being provided successively between the immediately previously provided channel and said one edge of the layer, there being provided successively a plurality of regions of the layer, through each of such regions a current does not flow, each such successively provided region being partially enclosed by the first channel and the immediately previously provided channel, the regions being of successively smaller breadths between said one edge of the layer and the immediately previously provided channel, each succeeding further channel extending at least partially within the region, through which a current does not flow, and partially enclosed by the first channel and the immediately previously provided channel, and in the method there being predetermined and successively greater accuracies associated with the constituent trimming actions, the magnitude of any trimming obtained in each of the successive further trimming actions being determined by the amount the corresponding further channel extends beyond the region, through which a current does not flow, and partially enclosed by the first channel and the immediately previously provided channel.

* * * * *